(No Model.)
J. N. BROWN.
WEIGHING HAND TRUCK.
No. 411,576. Patented Sept. 24, 1889.
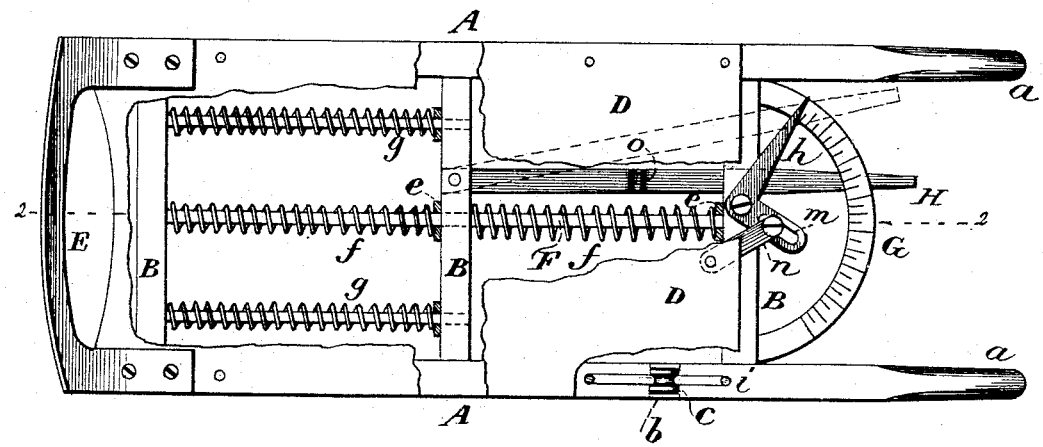
Witnesses.
A. Ruppert.
H. A. Daniels.
Inventor:
Joseph N. Brown
Per
Thomas P. Simpson
Atty

UNITED STATES PATENT OFFICE.

JOSEPH N. BROWN, OF FARWELL, MICHIGAN, ASSIGNOR OF ONE-HALF TO FRANK E. PRESLEY, OF SAME PLACE.

WEIGHING HAND-TRUCK.

SPECIFICATION forming part of Letters Patent No. 411,576, dated September 24, 1889.

Application filed May 11, 1889. Serial No. 310,444. (No model.)

*To all whom it may concern:*

Be it known that I, JOSEPH N. BROWN, a citizen of the United States, residing at Farwell, in the county of Clare and State of Michigan, have invented certain new and useful Improvements in Hand-Trucks; and I do hereby declare the following to be a full, clear, and exact description of the invention, such as will enable others skilled in the art to which it appertains to make and use the same.

This invention relates to hand-trucks which are commonly used in warehouses and stores for moving boxes and other packages; and it consists in certain improvements in such implements, as hereinafter described and claimed, the truck being provided with certain attachments for weighing a package or article placed thereon.

In the accompanying drawings, Figure 1 represents a plan view of a hand-truck provided with my improvements, part of the platform being removed. Fig. 2 is a section taken on line 2 2 of Fig. 1. Fig. 3 is an end view of the lower end.

A designates the side rails of the truck-frame, said rails being provided with handles $a$.

B indicates the cross-bars, and C the wheels on an axle, which is secured to the lower end of the frame in the usual way.

D indicates the platform of the truck, to the forward or lower end of which is fastened the flange or foot E.

To the side rails A are fastened the lugs $b$, in which are journaled the rollers $c$, which are formed with V-shaped grooves and run on correspondingly-formed rails or tracks $d$, which are fastened to the platform D on the lower side of the same.

F indicates a rod, which is fixed in the cross-bars B and extends along the longitudinal center of the frame, said rod passing through the lugs $e$, which are fastened to the lower side of the platform. Each of said lugs $e$ is so located that it is pressed upward against a cross-bar by a spiral spring $f$, which is placed on the rod F, each spring pressing at one end against a lug $e$ and against a cross-bar B at its opposite end. Two springs $g$ are placed one on either side of the central rod F. The platform may be further secured to the frame by means of staples or bent rods $i$, which extend under the rollers $c$, and are fastened at their ends to the platform.

G indicates a curved bar, which has a scale marked thereon and is fixed between the side rails over the uppermost bar B. An indicating-hand $h$ is pivoted to the said uppermost bar in position opposite the scale on the curved bar G. The said indicator $h$ is provided with a slotted arm $m$, which is connected with a fixed arm $n$, which extends from the upper end of the platform. As the platform moves forward under the load the platform-arm $n$ turns the elbow-lever $h$ $m$ so as to indicate the weight of the load on the scale G.

H indicates a hand-lever, which is provided with a projection $o$, and is secured to a cross-bar of the frame in position to connect with a catch $p$ on the lower side of the platform. The purpose of the lever H and the catch $p$ is to support the platform when the weighing devices are not in use, and thus relieve the springs of the strain upon them.

The box or package to be weighed is raised upon the platform in the usual manner, the foot E being first inserted under the box, the platform is released by moving the lever H from connection with the catch $p$, and the loaded platform sinks, compressing the springs $f$, the grooved rollers $c$ moving on the tracks $d$, and the pivoted indicator is operated by the movement of the platform, so that the weight of the box is indicated on the scale-bar G.

I claim—

The combination, with the frame provided with a scale-bar and indicator, a rod F, springs $f$ $g$, and a series of rollers $c$, of a movable platform provided with tracks $d$, lugs $e$, and catch $p$, and a lever H in position to connect with catch $p$, substantially as set forth and described.

In testimony whereof I have affixed my signature in presence of two witnesses.

JOSEPH N. BROWN.

Witnesses:
H. M. ROYS,
E. S. HINDS.